United States Patent
Attar et al.

(10) Patent No.: US 7,206,598 B2
(45) Date of Patent: Apr. 17, 2007

(54) METHOD AND APPARATUS FOR A CONTROL CHANNEL POWER ALLOCATION IN A COMMUNICATION SYSTEM

(75) Inventors: Rashid Ahmed Attar, San Diego, CA (US); Naga Bhushan, San Diego, CA (US); Mingxi Fan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 587 days.

(21) Appl. No.: 10/643,603

(22) Filed: Aug. 18, 2003

(65) Prior Publication Data

US 2005/0020295 A1    Jan. 27, 2005

Related U.S. Application Data

(60) Provisional application No. 60/490,338, filed on Jul. 25, 2003.

(51) Int. Cl.
*H04B 7/00* (2006.01)
*H04Q 7/20* (2006.01)

(52) U.S. Cl. ............... 455/522; 455/69; 455/70; 370/335; 370/342; 370/349

(58) Field of Classification Search ......... 455/522, 455/69, 70; 370/335, 342, 349, 332, 441
See application file for complete search history.

(56) References Cited

U.S. PATENT DOCUMENTS

| | | | |
|---|---|---|---|
| 6,687,510 B2* | 2/2004 | Esteves et al. | 455/522 |
| 6,973,065 B2* | 12/2005 | Hayashi et al. | 370/335 |
| 2002/0136286 A1* | 9/2002 | Koo | 375/225 |
| 2003/0093364 A1* | 5/2003 | Bae et al. | 705/37 |
| 2003/0124988 A1* | 7/2003 | Bae et al. | 455/88 |
| 2003/0218997 A1* | 11/2003 | Lohtia et al. | 370/335 |
| 2004/0181569 A1* | 9/2004 | Attar et al. | 709/200 |
| 2005/0002349 A1* | 1/2005 | Hayashi et al. | 370/320 |
| 2005/0036458 A1* | 2/2005 | Yoon et al. | 370/328 |
| 2005/0078640 A1* | 4/2005 | Kim et al. | 370/335 |
| 2005/0201296 A1* | 9/2005 | Vannithamby et al. | 370/241 |

* cited by examiner

*Primary Examiner*—Edan Orgad
(74) *Attorney, Agent, or Firm*—Thomas R. Rouse; Thien T. Nguyen; Lee Hsu

(57) ABSTRACT

An apparatus and a method for a control channel power allocation in a communication system are disclosed. The method of control channel power allocation in an embodiment includes sorting a plurality of access terminals in an order of increasing required medium access control (MAC) channel power into a plurality of bins, sorting the access terminals with equal required MAC channel power in an order of decreasing forward link signal to interference and noise ratio (FL_SINR) if two or more access terminals have equal required MAC channel power, and determining total available ARQ power based upon total MAC channel power, total power allocated to reverse power control (RPC) channels, and total power allocated to reverse activity bit (RAB) channels.

26 Claims, 8 Drawing Sheets

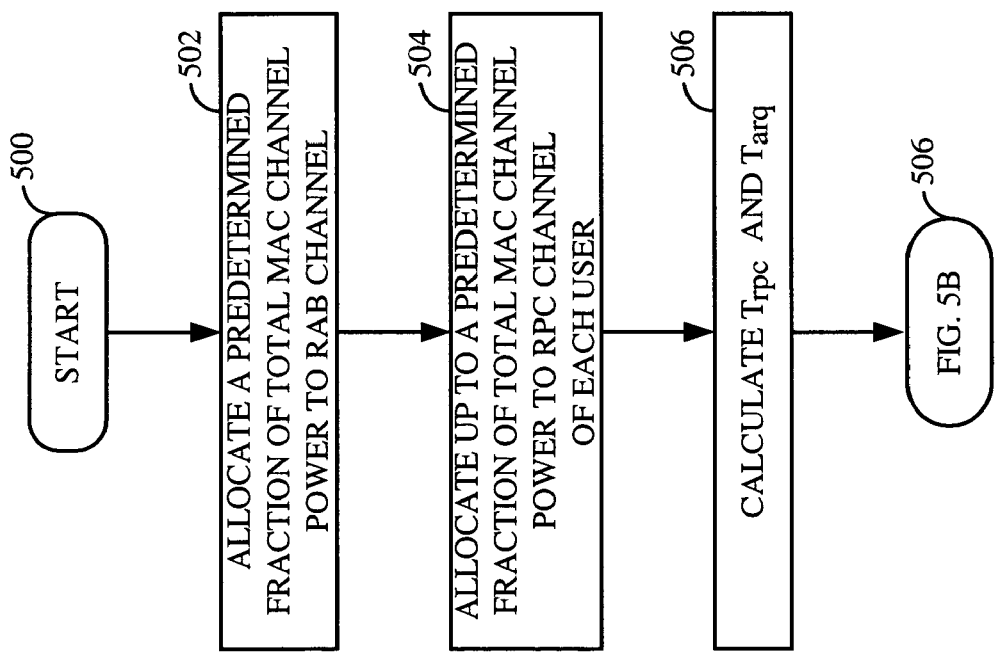

METHOD AND APPARATUS FOR A CONTROL CHANNEL POWER ALLOCATION IN A COMMUNICATION SYSTEM

CLAIM OF PRIORITY UNDER 35 U.S.C. §119

The present Application for Patent claims priority to Provisional Application No. 60/490,338, entitled "Method and Apparatus for a Control Channel Power Allocation in a Communication System," filed Jul. 25, 2003, and assigned to the assignee hereof and hereby expressly incorporated by reference herein.

BACKGROUND

1. Field

The present invention relates to communications in a wireless communication system. More particularly, the present invention relates to a method and system for power allocation to control channel(s) in such a communication system.

2. Background

Communication systems have been developed to allow transmission of information signals from an origination station to a physically distinct destination station. In transmitting an information signal from the origination station over a communication channel, the information signal is first converted into a form suitable for efficient transmission over the communication channel. Conversion, or modulation, of the information signal involves varying a parameter of a carrier wave in accordance with the information signal in such a way that the spectrum of the resulting modulated carrier wave is confined within the communication channel bandwidth. At the destination station, the original information signal is reconstructed from the modulated carrier wave received over the communication channel. In general, such a reconstruction is achieved by using an inverse of the modulation process employed by the origination station.

Proper power allocation to the control channels supporting the reverse link transmission is required. It is desirable that MAC channel power not be a limiting factor in supporting a large number of simultaneous reverse link users. Because MAC channel forms two bursts immediately before and immediately after a pilot burst in a given half-time-slot, only a limited amount of time is available for allocating MAC channel power to the control channels. It is desirable to ensure that limitations on the number of simultaneous supportable users are not due to the total MAC channel power but due to reverse link capacity. Additionally, a communication system may need to support both legacy access terminals, i.e., access terminals transmitting on a reverse link complying with a standard, such as the IS-856 standard, and new access terminals, i.e., access terminals transmitting on a reverse link complying with a standard that is backward compatible with IS-856. Therefore, there is a need in the art for an apparatus and method for power allocation to control channel in such a communication system.

SUMMARY OF THE INVENTION

In one aspect of the invention, the above stated needs are addressed by a method of control channel power allocation including sorting a plurality of access terminals in an order of increasing required medium access control (MAC) channel power into a plurality of bins, sorting the access terminals with equal required MAC channel power in an order of decreasing forward link signal to interference and noise ratio (FL_SINR) if two or more access terminals have equal required MAC channel power, and determining total available ARQ power based upon total MAC channel power, total power allocated to reverse power control (RPC) channels, and total power allocated to reverse activity bit (RAB) channels.

BRIEF DESCRIPTION OF THE DRAWINGS

FIGS. 5A–5C illustrate flowcharts of a more detailed embodiment of a method of power allocation to control channels;

DETAILED DESCRIPTION

Figure 1:
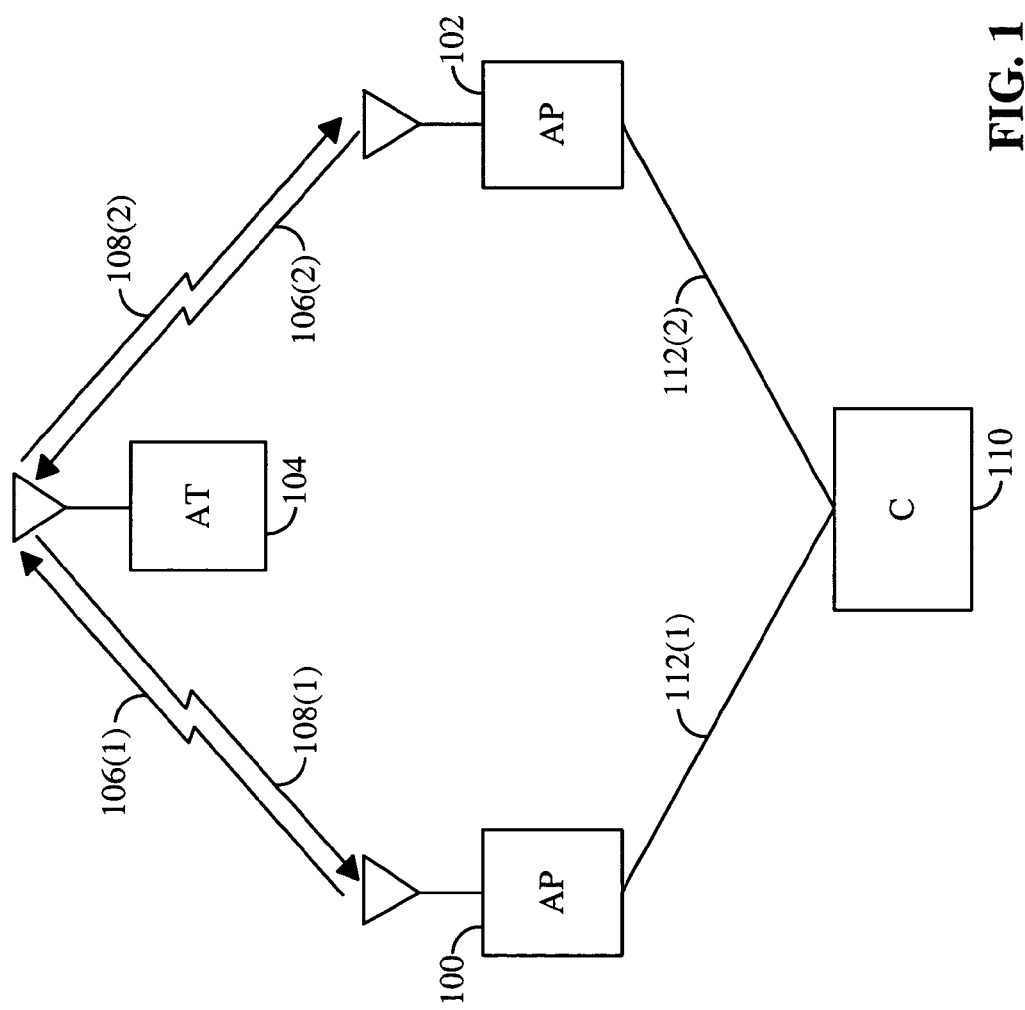
FIG. 1 illustrates a conceptual block diagram of a communication system.

FIG. 1 illustrates a conceptual diagram of a typical code division multiple access (CDMA) communication system. An access point 100 transmits data to an access terminal 104 over a forward link 106(1), and receives data from the access terminal 104 over a reverse link 108(1). Similarly, an access point 102 transmits data to another access terminal 104 over a forward link 106(2), and receives data from the access terminal 104 over a reverse link 108(2). Data transmission on the forward link occurs from one access point to one access terminal at or near the maximum data rate that can be supported by the forward link and the communication system. Additional channels of the forward link, e.g., control channel, may be transmitted from multiple access points to one access terminal. Reverse link data communication may occur from one access terminal to one or more access points. The access point 100 and the access point 102 are connected to an access network controller 110 over backhauls 112(1) and 112(2). A "backhaul" is a communication link between a controller and an access point. Although only two access terminals and one access point are shown in FIG. 1, this is for the sake of explanation only, and the communication system can comprise a plurality of access terminals and access points.

After registration, which allows an access terminal to access an access network, the access terminal 104 and one of the access points, e.g., the access point 100, establish a communication link using a predetermined access procedure. In the connected state, resulting from the predetermined access procedure, the access terminal 104 is able to receive data and control messages from the access point 100, and is able to transmit data and control messages to the access point 100. The access terminal 104 continually searches for other access points that could be added to the access terminal's 104 active set. An active set comprises a list of access points capable of communication with the access terminal 104. When such an access point is found, the access terminal 104 calculates a quality metric of the access point's forward link, which may comprise a signal-to-interference-and-noise ratio (SINR). An SINR may be determined in accordance with a pilot signal. The access terminal 104 searches for other access points and determines SINR for signal transmitted from each of those access points and received at the access terminal 104. Simultaneously, the access terminal 104 calculates a quality metric of a forward link for each access point in the access terminal's 104 active set. If the forward link quality metric from a particular access point is above a predetermined add threshold or below a predetermined drop threshold for a predetermined period of time, the access terminal 104 reports this information to the access point 100. Subsequent messages from the access point 100 may direct the access terminal 104 to add to or to delete from the access terminal 104 active set of the particular access point.

The access terminal 104 selects a serving access point from the access terminal's 104 active set based on a set of parameters. A serving access point is an access point that is selected for data communication with a particular access terminal or an access point that is communicating data to the particular access terminal. The set of parameters may comprise any one or more of present and previous SINR measurements, a bit-error-rate, a packet-error-rate, for example, and any other known parameters. Thus, for example, the serving access point may be selected in accordance with the largest SINR measurement. The access terminal 104 then broadcasts a data request message (DRC message) on a data request channel (DRC channel). The DRC message can contain a requested data rate or, alternatively, an indication of a quality of the forward link, e.g., measured SINR, a bit-error-rate, a packet-error-rate and the like. The access terminal 104 may direct the broadcast of the DRC message to a specific access point by the use of a code, which uniquely identifies the specific access point. Typically, the code comprises a Walsh code. The DRC message symbols are exclusively OR'ed (XOR) with the unique code. This XOR operation is referred to as code covering of a signal. Since each access point in the active set of the access terminal 104 is identified by a unique Walsh code, only the selected access point which performs the identical XOR operation as that performed by the access terminal 104 with the correct Walsh code can correctly decode the DRC message.

The data to be transmitted to the access terminal 104 arrive at the access network controller 110. Thereafter, the access network controller 110 may send the data to all access points in the access terminal 104 active set over the backhaul 112. Alternatively, the access network controller 110 may first determine, which access point was selected by the access terminal 104 as the serving access point, and then send the data to the serving access point. The data are stored in a queue at the access point(s). A paging message is then sent by one or more access points to the access terminal 104 on respective control channels. The access terminal 104 demodulates and decodes the signals on one or more control channels to obtain the paging messages.

At each forward link interval, the access point may schedule data transmissions to any of the access terminals that received the paging message. An exemplary method for power allocation to reverse power control (RPC) channels is described in U.S. patent application Ser. No. 10/263,976, entitled "Power Allocation for Power Control Bits in a Cellular Network," filed Oct. 2, 2002, assigned to the present assignee. The access point uses the rate control information received in the DRC message from each access terminal to efficiently transmit forward link data at the highest possible rate. Because the rate of data may vary, the communication system operates in a variable rate mode. The access point determines the data rate at which to transmit the data to the access terminal 104 based on the most recent value of the DRC message received from the access terminal 104. Additionally, the access point uniquely identifies a transmission to the access terminal 104 by using a spreading code, which is unique to that mobile station. This spreading code is a long pseudo noise (PN) code, for example, a spreading code defined by the IS-856 standard.

The access terminal 104, for which the data packet is intended, receives and decodes the data packet. Each data packet is associated with an identifier, e.g., a sequence number, which is used by the access terminal 104 to detect either missed or duplicate transmissions. In such an event, the access terminal 104 communicates the sequence numbers of the missing data packets via the reverse link data channel. The access network controller 110, which receives the data messages from the access terminal 104 via the access point communicating with the access terminal 104, then indicates to the access point what data units were not received by the access terminal 104. The access point then schedules a re-transmission of such data packets.

When the communication link between the access terminal 104 and the access point 100, operating in the variable rate mode, deteriorates below a predetermined reliability level, the access terminal 104 first attempts to determine whether another access point in the variable rate mode can support an acceptable rate of data. If the access terminal 104 ascertains such an access point (e.g., the access point 102), a re-pointing to the access point 102 to a different communication link occurs. The term re-pointing is a selection of a sector that is a member of an access terminals' active list, wherein the sector is different than a currently selected sector. The data transmissions continue from the access point 102 in the variable rate mode.

The above-mentioned deterioration of the communication link can be caused by, e.g., the access terminal 104 moving from a coverage area of the access point 100 to the coverage area of the access point 102, shadowing, fading, and other well known reasons. Alternatively, when a communication link between the access terminal 104 and another access point (e.g., the access point 102) that may achieve a higher throughput rate than the currently used communication link becomes available, a re-pointing to the access point 102 to a different communication link occurs, and the data transmissions continue from the access point 102 in the variable rate mode. If the access terminal 104 fails to detect an access point that can operate in the variable rate mode and support an acceptable data rate, the access terminal 104 transitions into a fixed rate mode. In such a mode, access terminal transmits at one rate.

The access terminal 104 evaluates the communication links with all candidate access points for both variable rate data and fixed rate data modes, and selects the access point, which yields the highest throughput.

The access terminal 104 will switch from the fixed rate mode back to the variable rate mode if the sector is no longer a member of the access terminal 104 active set.

Reverse Link

A communication system in accordance with the above-described concepts may need to support both the legacy access terminals, transmitting on a reverse link complying with one standard, i.e., IS-856, and new access terminals transmitting on a reverse link complying with another standard, i.e., a reverse link as described in the above-mentioned co-pending application Ser. Nos. 10/280,740 and 10/305,338.

Figure 2:
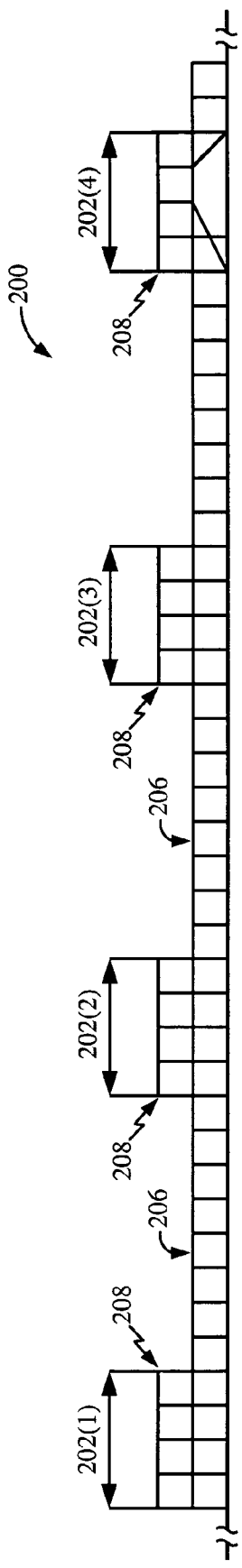
FIG. 2 illustrates a simplified reverse link structure for new access terminals.

A new access terminal's reverse link 200 is illustrated in FIG. 2. The new access terminals also build a packet into a frame comprising 16 time-slots. The frame is then transmitted in at least two non-contiguous sub-frames, each of the sub-frames comprising at least one time slot. The reverse link overhead channels 206 comprise: a Pilot Channel (PC), an Auxiliary Pilot Channel (APC), a Data Request channel (DRC), an Acknowledgement channel (ACK), Data Source Control channel (DSC), and a Reverse Rate Indication channel (RRI). As illustrated in FIG. 2, the packet is transmitted in four non-contiguous sub-frames 202, each sub-frame comprising four time slots. The overhead channels 206 are transmitted continuously.

Reverse Link Processing

The access terminal receives the first sub-frame and attempts to decode the user data contained in the sub-frame. The access terminal then may transmit a response in accordance with the decoding result. The response is an acknowledgement (ACK) if the decoding was successful and a non-acknowledgement (NAK) if the decoding was not successful.

The response is received at the access point before the next sub frame is transmitted. Consequently, if the access point receives an ACK, the transmission of all remaining sub-frames is aborted, and the access point may transmit a sub-frame of an, as yet, non transmitted packet.

Forward Link Structure

Figure 3:
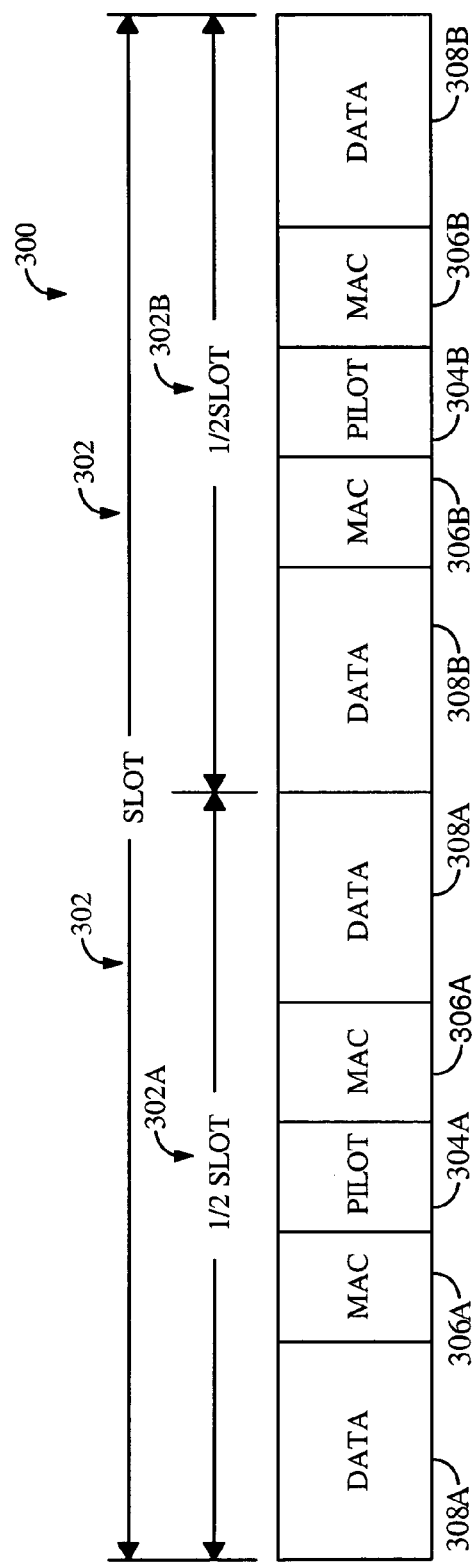
FIG. 3 illustrates a time slot in a forward link structure.

FIG. 3 illustrates a time slot in a forward link structure 300. It will be appreciated that the below described time durations, chip lengths, value ranges are given in a way of example only, and other time durations, chip lengths, value ranges may be used without departing from the underlying principles of operation of the communication system.

The forward link 300 is defined in terms of frames. A frame is a structure comprising 16 time-slots 302, each time-slot 302 being 2048 chips long, corresponding to a 1.66 ms time-slot duration, and, consequently, a 26.66 ms frame duration. Each time-slot 302 is divided into two half-time-slots 302A, 302B, with pilot channel bursts 304A, 304B transmitted within each half-time-slot 302A, 302B. Each pilot channel burst 304A, 304B is 96 chips long, centered about a mid-point of its associated half-time-slots 302A, 302B. The pilot channel bursts 304A, 304B comprise a pilot channel signal covered by a code, e.g., a Walsh code with index 0. The pilot channel is a common control channel broadcasted to all remote stations, i.e., information transmitted on the pilot channel is intended to be received and used by all remote stations. In general, a control channel carries overhead data, but may also carry user data. The term overhead data is information enabling operation of entities in a communication system, e.g., call maintenance signaling, diagnostic and reporting information, and the like.

A forward medium access control (MAC) channel 306 forms two bursts, which are transmitted immediately before and immediately after the pilot burst 304 of each half-time-slot 302. The MAC is composed of up to 128 code channels, which are orthogonally covered by 128-ary code, e.g., Walsh code. Each code channel is identified by a MAC index, which has a value between 1 and 128, and identifies a unique 128-ary covering Walsh code.

A reverse power control (RPC) channel is used to regulate the power of the reverse link signals for each subscriber station. Consequently, RPC channel is a control channel dedicated for a subscriber station, i.e., the power control information transmitted on a particular RPC channel is intended to be received and used by one remote station. The RPC is assigned to one of the available MACs, e.g., MAC with a MAC index between 11 and 127. In an embodiment, MAC indices 0–1 are reserved, MAC indices 2–3 are for control channels, MAC index 4 is for the reverse activity (RA) channel, MAC index 5 is for broadcast, MAC indices 6–10 are for multi-user packets, and MAC indices 11–127 are for RPC, DRC Lock and ARQs. In an embodiment, MAC indices 64–67 are also used for control channels.

A Reverse Activity (RA) Channel is used to regulate the reverse link rate of data for each subscriber station by transmitting a reverse link activity bit (RAB) stream, and as such, RA channel is a control channel dedicated for a subscriber station. The RA channel is assigned to one of the available MACs, e.g., MAC index 4.

The forward link traffic channel or the control channel payload is sent in the remaining portions 308A of the first half-time-slot 302A and the remaining portions 308B of the second half-time-slot 302B. The traffic channel carries user data, i.e., information other than overhead data. The total transmit power on the forward channel is fixed and does not change as a function of time.

In general, the forward link is amplified before transmission. An amplifier can provide a limited total output power without undesirably distorting the amplified signals; consequently, the more power transmitted in one channel, the less power is available to the other channels. As described, the forward link comprises time-division multiplexed traffic channel, pilot channel, and medium access control channels (MACs). Because the forward link is always transmitted at a limited total output power ($P_{PAM}$), and the MACs including the reverse activity channel (RA), the reverse power control channels (RPC), the DRC Lock channels, and the acknowledgement/non-acknowledgement channels (ACK/NAK) are code division multiplexed, the $P_{PAM}$ must be allocated among the RA channel, the RPC channels, the DRC Lock channels, and the ACK/NAK channels.

Optimal allocation of MAC channel power may ensure that MAC channel power is not a limiting factor in supporting a large number of users, and that reverse link capacity is maximized. Improper or insufficient power allocation may result in errors in power control, which may result in less than optimal capacity. The effect of improper or insufficient power allocation to the RPC channels is lesser, because such an improper or insufficient power allocation is compensated by a closed-loop power control. In contrast, improper or insufficient power allocation to ACK/NAK channels may result in packets either not being terminated early, which results in increased interference.

Forward Link
Acknowledgement/Non-acknowledgement Channel

As discussed, the communication system may need to support both access terminals operating the reverse link in accordance with the IS-856 standard—legacy access terminals, and access terminals operating the reverse link in accordance with the described concept—new access terminals. To support such an operation, each new access terminal transmitting on a reverse link must be provided with information whether a user data transmitted in a sub-frame have been decoded by an access point. To provide such information an additional channel, an Acknowledgement/Non-acknowledgement Channel (ACK/NAK) channel, is needed on the forward link. The ACK/NAK channel may be provided by utilizing the in-phase or quadrature branch of the MAC channel assigned to a given terminal.

Automatic Repeat Request (ARQ) Channel Transmission Rules

At a given base transceiver station (BTS), physical layer ARQ is applied to all users in the system, whereas MAC layer ARQ is only supported for users whose active cell size, defined as the number of cells in the active set, is equal to 1. For each user, the ARQ message from the serving cell BTS is bipolar keyed, that is, acknowledgement (ACK)=+1 and non-acknowledgement (NAK)=−1 after the first, second and third subpackets if there is sufficient MAC power. The non-serving cell BTS transmits ARQ after the first, second and third subpackets using on-off keying (OOK), that is, ACK=+1 and NAK=0. These ARQ messages are transmitted over three slots. To support the MAC layer ARQ for non-handoff users, the ARQ message corresponds to the fourth subpacket using an OOK scheme in which ACK=0 and NAK=−1 and extends over six slots. The three-slot extended ARQ, also referred to as E-ARQ, and the regular non-extended ARQ for the next subpacket are I-Q multiplexed.

A subpacket is the smallest unit of a Reverse Traffic Channel transmission that can be acknowledged at the physical layer by the access network. A sub-packet is transmitted over 4 contiguous slots. A sub-frame is a group of 4 contiguous slots in which the access terminal may transmit a sub-packet. At the start of the sub-frame, the CDMA system time in slots T satisfies the equation (T-FrameOffset) mod 4=1. Each physical layer packet shall be transmitted in one or more sub-packets, up to a maximum of 4 sub-packets. The interval between transmissions of successive sub-packets of a single reverse traffic channel physical layer packet shall be two sub-frames or 13.33 ms.

The reverse link traffic channel transmissions shall use a 4-8-4 slot interlaced structure. That is, the transmit slots of a physical layer sub-packet (4-slots duration) shall be separated by an interval of 8 slot duration when sub-packets of other physical layer packets may be transmitted. If a positive acknowledgement is received on the forward link ARQ channel the access terminal shall terminate transmission of that packet and the next sub-frame in that interlace offset may be used for the first sub-packet of a new physical layer packet transmission. The access terminal shall continue transmission of sub-packets of a physical layer packet until it either receives a positive acknowledgement on the forward link ARQ Channel or it has transmitted all the 4 sub-packets of the physical layer packet on that interlace.

The Forward ARQ Channel and the Forward D-ARQ Channel are used by the sector to transmit an ACK or NAK to the access terminal. The Forward ARQ Channel and the Forward D-ARQ Channel shall be transmitted in 3 successive slots.

If the ARQMode is '0' the sector shall transmit the Forward ARQ Channel following reception of the 1st, 2nd or 3rd sub-packet of a Reverse Traffic Channel packet transmission using bi-polar keying, i.e., +1=>ACK, −1=>NAK, if it is part of the serving cell on the forward channel and using ACK-oriented On-Off keying, i.e., +1=>ACK, 0=>NAK, if it is not part of the serving cell on the Forward Channel, where ARQMode is public data of the Reverse Traffic Channel MAC protocol.

If the ARQMode is '1' the sector shall transmit the Forward ARQ Channel following reception of the 1st, 2nd and 3rd sub-packets of the Reverse Traffic Channel packet transmission using ACK-oriented On-Off keying, i.e., +1=>ACK, 0=>NAK.

The sector shall transmit the Forward ARQ Channel following reception of the 4th sub-packet of a Reverse Traffic Channel packet transmission from an access terminal only if the access terminal's active cell size, defined as the number of cells in the access terminal's active set, is 1, using NAK-oriented On-Off keying, i.e., 0=>ACK, −1=>NAK.

If the access terminal's active cell size is greater than 1, the sector shall not transmit the Forward D-ARQ Channel. Otherwise, the sector shall transmit the Forward D-ARQ Channel using NAK-oriented On-Off keying, i.e., 0=>ACK, −1=>NAK. The sector shall begin transmission of the Forward link D-ARQ Channel in slot n, for a Reverse Link traffic channel packet transmission that commenced in slot n−48.

The ARQ message for a Reverse Traffic Channel sub-packet transmitted in slots n, n+1, n+2 and n+3 shall be transmitted in slots n+8, n+9 and n+10. The D-ARQ message for a Reverse Traffic Channel packet transmitted starting in slot n is transmitted in slots n+48, n+49 and n+50.

Forward Link (FL) Medium Access Control (MAC) Channel Power Allocation

As described above, a forward link amplifier can provide a limited total output power ($P_{PAM}$) without undesirably distorting the amplified signals. As described above, the forward link comprises time-division multiplexed traffic channel, pilot channel, and MACs. Because the forward link is always transmitted at the PPAM and the MACs, i.e., the reverse activity bit (RAB) channel, the reverse power control channels (RPC), and the acknowledgement/non-acknowledgement channels (ACK/NAK) are code division multiplexed, the $P_{PAM}$ comprises power allocated to the RA channel ($P_{RACH}$), power allocated to RPC channels ($P_{RPCCH}$), and power allocated to ACK/NAK channels ($P_{ACK/NAK}$).

Figure 4:
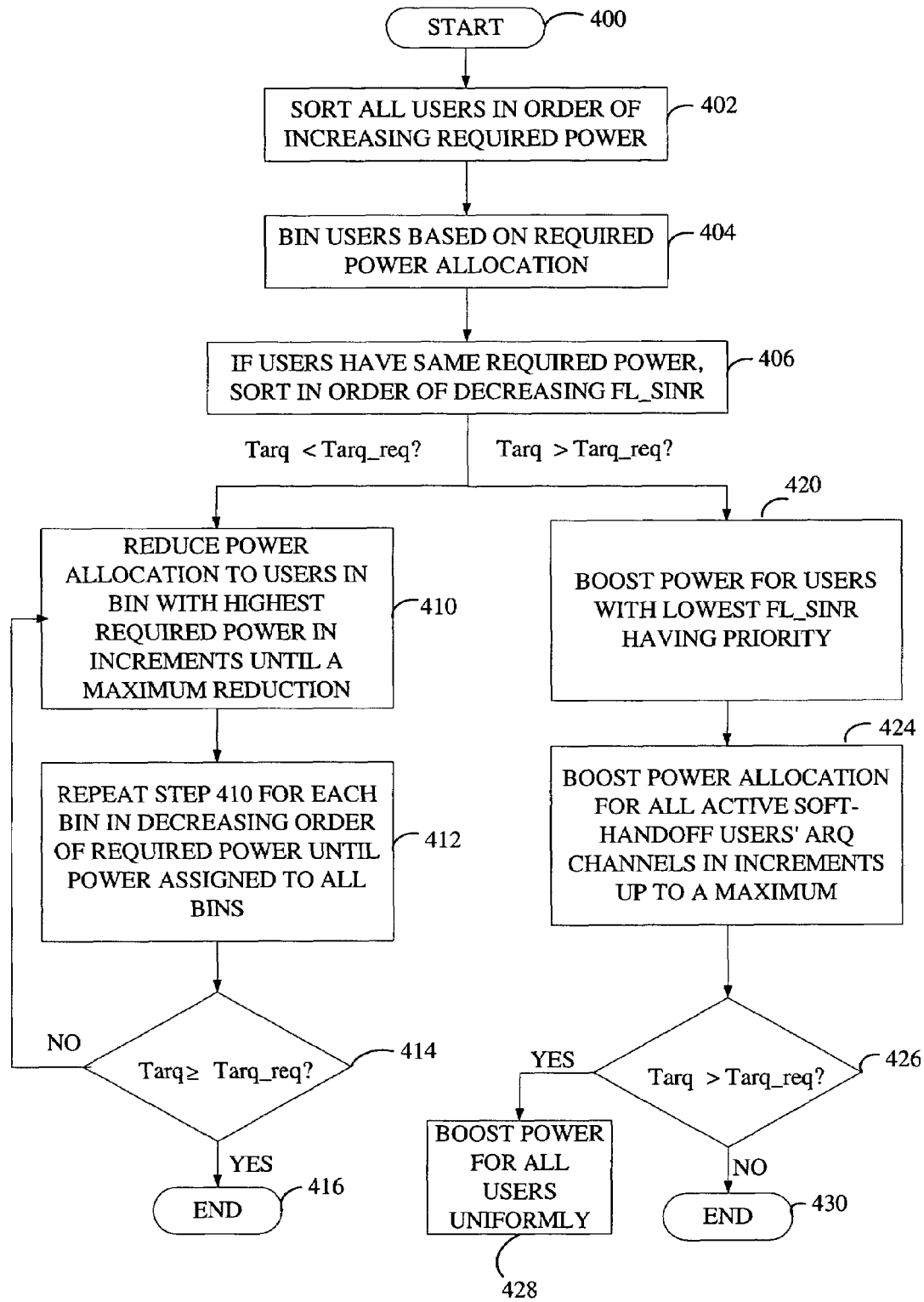
FIG. 4 illustrates a flowchart of an embodiment of a method of power allocation to control channels.

FIG. 4 is a flowchart illustrating an embodiment of the present invention. The power allocation starts in step 400 and continues in step 402. All users in the coverage area of the cell are sorted in order of increasing required MAC channel power in step 402. The users are then placed in different bins based on the required power allocation in step 404. If some of the users have the same required ARQ power, then these users are sorted in the order of decreasing forward link signal to interference and noise ratio (FL_SINR) in step 406.

If the total MAC channel power Tarq available for allocation is less than the total required MAC channel power of all users Tarq_req, then the method proceeds to step 410, which reduces power allocation to users in the bin with the highest required ARQ power in predetermined increments until a predetermined maximum amount of reduction is achieved. In an exemplary embodiment, the power allocated to the users in the bin with the highest required ARQ power may be reduced by predetermined increments, for example, of 1 dB, up to a maximum limit, for example, of 3 dB. The method then proceeds to step 412.

In step 412, power allocation to users in each bin in decreasing order of required ARQ power is reduced in predetermined increments until a predetermined maximum amount of reduction is achieved for the bin. In an exemplary embodiment, power allocated to the users in a given bin may be reduced by predetermined increments, for example, of 1 dB, up to a maximum limit, for example, of 3 dB. The power allocation is reduced for users in each bin in decreasing order of required power until the available ARQ power is allocated to all bins or until Tarq is greater than or equal to Tarq_req. In step 414, if it is determined that Tarq is greater than or equal to Tarq_req, then the method ends in step 416. Otherwise, steps 410 and 412 are repeated until Tarq is greater than or equal to Tarq_req.

If Tarq is greater than Tarq_req after the users are binned based on the required power allocation in step 406, power allocation is boosted for the access terminals based on the sorted list of decreasing FL_SINR, with priority being given to users with the lowest FL_SINR in step 420.

If MAC channel power is available after boosting the power allocation for the access terminals based on the sorted list of decreasing FL_SINR, power allocation is boosted for all active users' ARQ channels in predetermined increments up to a predetermined maximum amount of increase in step 424. Active users may include non-server, soft-handoff users who do not consider the BTS as the serving cell and who are in a soft-handoff with the BTS. In an embodiment, the power allocation is boosted for all non-server, soft-handoff users' ARQ channels in increments of 1 dB up to a maximum increase of 3 dB. A determination is then made as to whether Tarq is greater than Tarq_req in step 426. If Tarq is greater than Tarq_req, all users are boosted in power uniformly in step 428. Otherwise, the method ends in step 430.

Figure 5B:
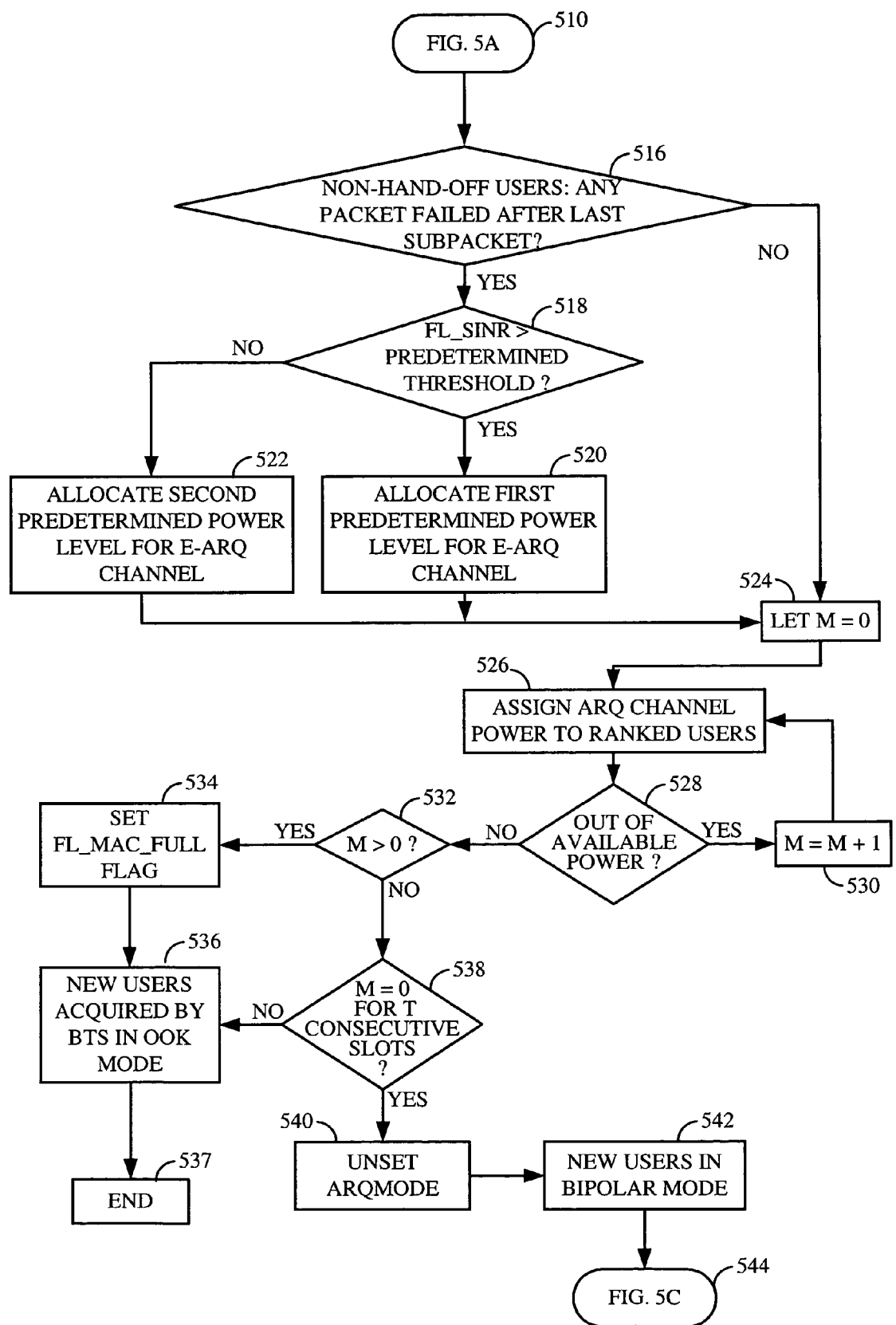
Figure 5C:
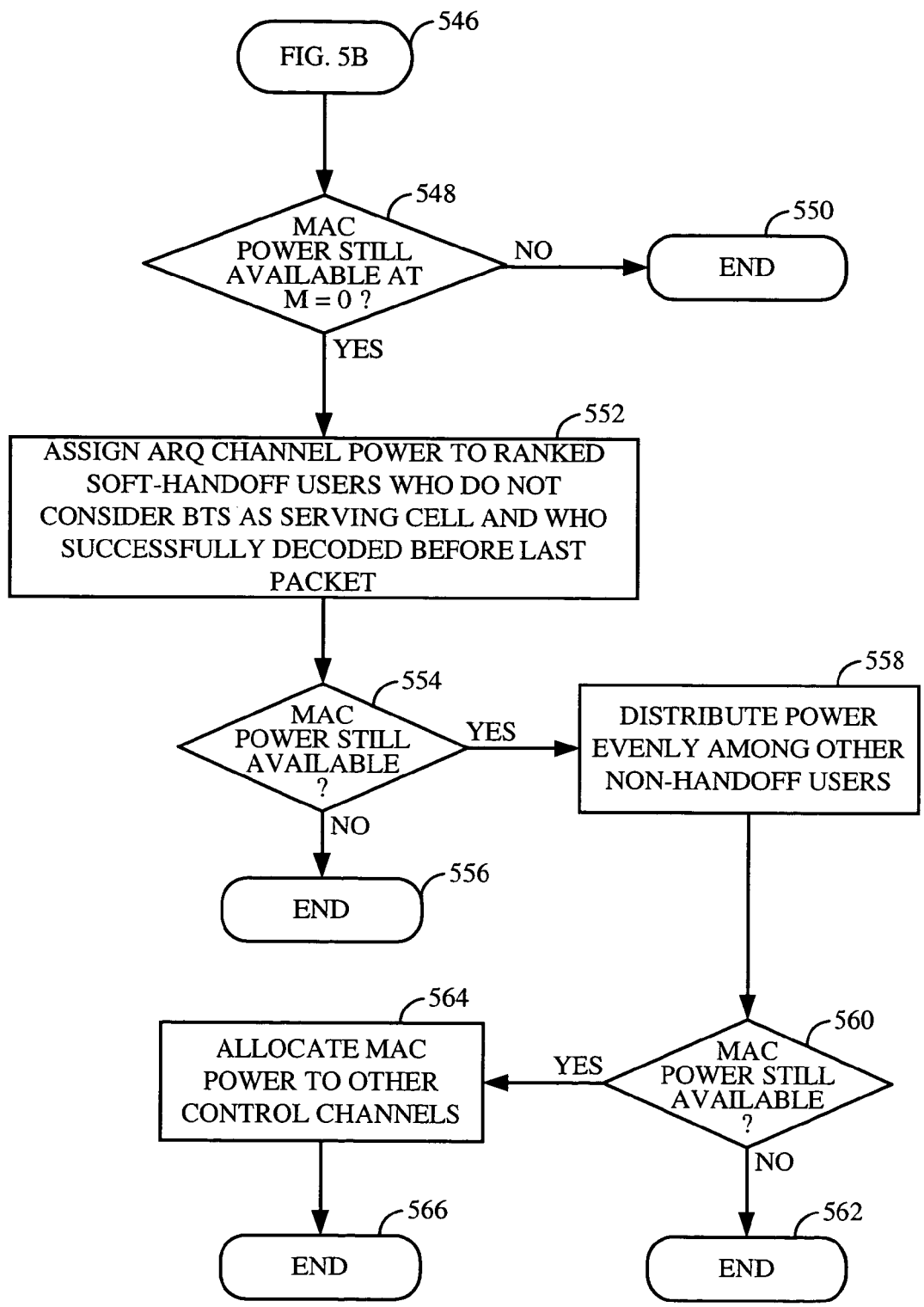

A more detailed embodiment of process steps for forward link MAC channel power allocation is illustrated in the flowcharts of FIGS. 5A–5C. As illustrated in the flow chart of FIG. 5A, the power allocation method starts in step 500 and continues in step 502. In step 502, a predetermined fraction, for example, 6% of the total MAC channel power is allocated to the RAB channel. The method then continues in step 504.

In step 504, the MAC channel power is allocated to the RPC channels of both legacy and new users. The RPC channel of each user is allocated an amount of power that is not more than a predetermined fraction, for example, not more than 3% of the total MAC channel power. The MAC channel power is also allocated to the data rate control lock (DRCLock) channel of new users in the same manner, that is, the DRCLock channel of each new user is allocated not more than 3% of the total MAC channel power. The method continues in step 506.

In step 506, the total RPC channel power allocation (Trpc) and the total ARQ channel power allocation (Tarq) are determined. In an embodiment, a maximum power allocation (Max_rpc_alloc) for the RPC channel is determined according to the following relationship:

$$Max\_rpc\_alloc=(Prpc,max*Overhead\_softhandoff/ Margin\_rpc)*(\#legacy+\#new*(PC\_Update\_rate/ 600)*Overhead\_drclock)$$

where Prpc,max is the maximum RPC channel power allocation per user, which is 3% of the total MAC channel power in an embodiment, where Overhead_softhandoff is the soft-handoff overhead which is the active cell size, where Margin_rpc is a power margin which is a scaling factor to allocate some fraction of maximum required power, where #legacy is the number of legacy users in the cell, where #new is the number of new users in the cell, where PC_Update_rate is the power control update rate, and where Overhead_drclock is the DRC Lock channel overhead for new users.

The total RPC channel power allocation (Trpc) is the lesser of the total required RPC channel power (Trpc_req) and Max_rpc_alloc. The total ARQ channel power allocation Tarq is given by the following relationship:

$$Tarq=T-Trpc-Trab$$

where T is the total MAC channel power, Trpc is the total RPC channel power allocation, and Trab is the RAB channel power allocation.

After the total RPC channel power (Trpc) and total ARQ channel power (Tarq) are determined in step 506, the method continues in step 508 to FIG. 5B.

FIG. 5B is a continuation of the flowchart of FIG. 5A in step 510 and continues to step 516. In step 516, only the non-handoff users are considered. If it is determined in step 516 that a sector of the base station fails to decode a packet after the fourth subpacket, which is the last subpacket within the packet, then a determination is made as to whether the forward link signal to interference and noise ratio (FL_SINR) is greater than a predetermined amount, for example, –2 dB, in step 518. If there are no non-handoff users in the cell, the method continues in step 524.

If it is determined that FL_SINR>–2 dB in step 518, then a predetermined amount of power, for example, –15 dB, is allocated to the E-ARQ channel of each non-handoff user whose fourth subpacket failed to be decoded in step 520. Otherwise, a different amount of power, for example, –12 dB, is allocated to the E-ARQ channel of each non-handoff user whose fourth subpacket failed to be decoded in step 522. After either step 520 or step 522 is completed, the method continues in step 524.

All users who regard the given BTS as the serving cell are then considered. These users are ranked for ARQ channel power allocation in the order of FL_SINR, which may be obtained from data rate control (DRC) information in an embodiment. A user with a higher FL_SINR is ranked higher in priority than a user with a lower FL_SINR. The method then enters one or more iterations starting with step 524, in which an integer M is initially set to 0. The method continues in step 526.

In step 526, the ARQ channel power is assigned to the ranked users according to their FL_SINR. In an embodiment, the ARQ channel power is allocated to the ranked users according to the following:

A. if FL_SINR<–2-M(dB), then assign –12 dB to the user

B. if –2-M(dB)<FL_SINR<2-M(dB), then assign –15 dB to the user

C. if FL_SINR>2-M(dB), then assign –18 dB to the user

If it is determined in step 528 that not enough MAC channel power is available for assignment in any of the above steps A, B or C, then M is incremented by 1 in step 530, and step 526 is repeated until all of the ranked users are assigned ARQ channel power. After ARQ channel power is allocated to all ranked users, the method continues in step 532.

In step 532, the system determines whether M>0, that is, whether more than one iteration was necessary to assign ARQ channel power to all ranked users. If M>0, then the system sets a flag, namely, ARQMode in step 534, and after the ARQMode flag is set, any new users in the sector acquired by the BTS will be in the OOK mode in step 536, even if the BTS is the serving cell for the new users. The method then ends in step 537.

Referring to FIG. 5B, if it is determined in step 538 that M=0 for at least a predetermined number of consecutive slots T, for example, where T is 16 or greater if the packet length is 16 slots, the system may unset the ARQMode flag in step 540, and new users acquired by the BTS are set in the bipolar mode once the BTS sector becomes the serving cell in step 542. The method then continues in step 544 to FIG. 5C. If M cannot be maintained at 0 for T consecutive slots in step 538, then any new users acquired by the BTS will be in the OOK mode in step 536.

FIG. 5C is a continuation of the flowchart of FIG. 5B in step 546 and continues to step 548. In step 548, the system determines whether MAC channel power is still available at M=0. If MAC channel power is no longer available at M=0, the method ends in step 550. Otherwise, the remaining MAC channel power may be assigned to forward link ARQ channels of ranked soft-handoff users who do not consider the BTS as the serving cell and who have successfully decoded their packets prior to the fourth subpacket which is the last subpacket of each packet in step 552. In an embodiment, these users are ranked in the order of their FL_SINR. A user with a higher FL_SINR is ranked at a higher priority than a user with a lower FL_SINR. A predetermined amount of power, for example, −9 dB, is assigned to the forward link ARQ channel of each of these users until the available MAC power is depleted or until all of these users are assigned ARQ channel power.

A determination is then made as to whether any remaining MAC channel power is still available in step 554. If no more MAC channel power is available, the method ends in step 556. If MAC channel power is still available, the excess power may be assigned to the ARQ channels of the non-handoff users who consider the BTS as the serving sector in step 558. The allocation should start from the user with the lowest FL_SINR with the BTS and move with increasing FL_SINR ranking of the users. The allocation should continue until all non-handoff users have −12 dB for ARQ channel power. If there is still MAC channel power available, the rest of the power is used to optimize the ARQ channel of non-handoff users further such that the ARQ channel of the user with the lowest FL_SINR is upgraded to −9 dB, and then the user with the second lowest FL_SINR, and so on. The process should continue until all users in the sector have −9 dB FL ARQ power.

After the ARQ channel power is allocated in step 558, a determination is made as to whether any MAC channel power is still available in step 560. If no more MAC channel power is available, the method ends in step 562. If MAC channel power is still available after step 560 and there are other control channels besides RPC, DRCLock and ARQ channels that need power, the MAC channel power may be allocated to other control channels in step 564, and subsequently the method ends in step 566.

AT and AP Structures

Figure 6:
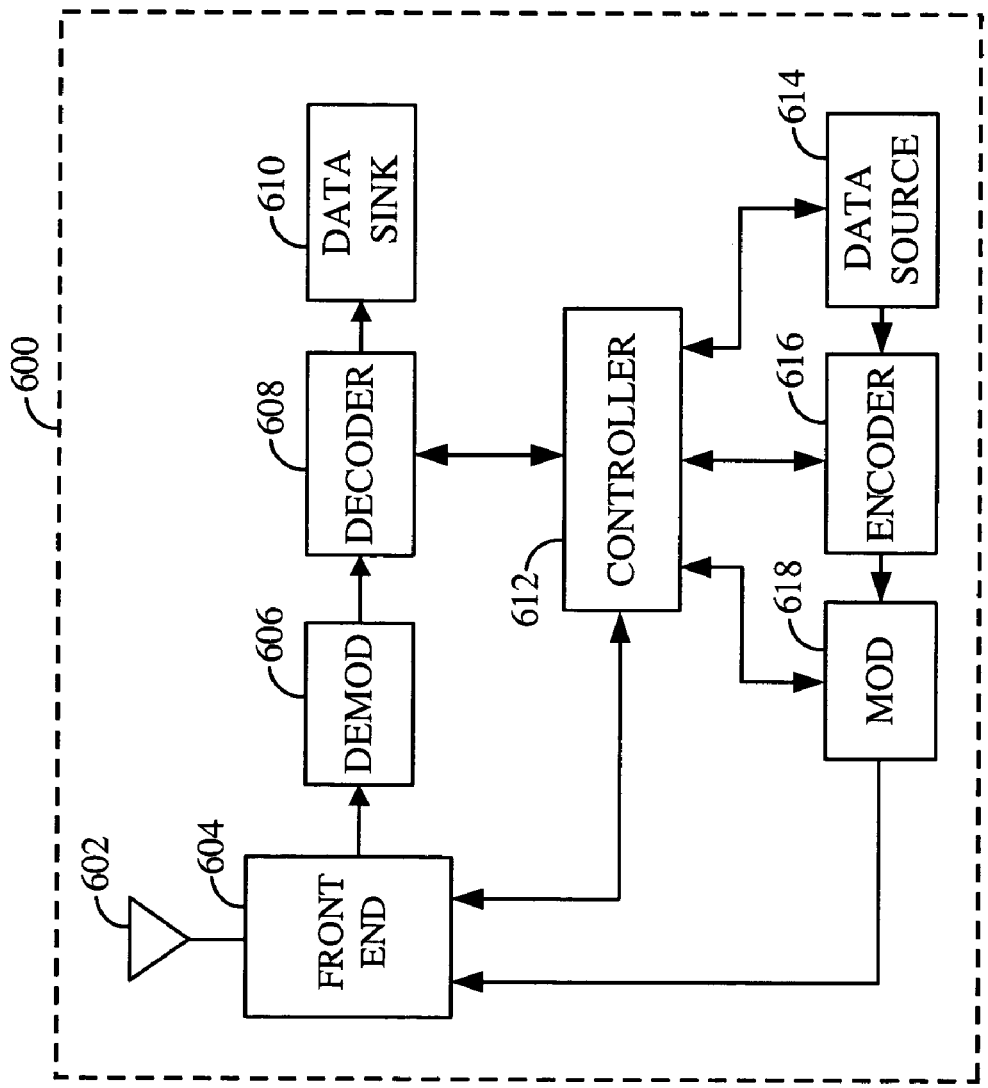
FIG. 6 illustrates an access terminal.

Access terminal 600 is illustrated in FIG. 6. Forward link signals are received by antenna 602 and routed to a front end 604 comprising a receiver. The receiver filters, amplifies, demodulates, and digitizes the signal provided by the antenna 602. The digitized signal is provided to demodulator (DEMOD) 606, which provides demodulated data to decoder 608. Decoder 608, performs the inverse of the signal processing functions done at an access terminal, and provides decoded user data to data sink 610. The decoder further communicates with a controller 612, providing to the controller 612 overhead data. The controller 612 further communicates with other blocks comprising the access terminal 600 to provide proper control of the operation of the access terminal's 600, e.g., data encoding, power control. Controller 612 can comprise, e.g., a processor and a storage medium coupled to the processor and containing a set of instructions executable the processor.

The user data to be transmitted to the access terminal are provided by a data source 614 by direction of the controller 612 to an encoder 616. The encoder 616 is further provided with overhead data by the controller 612. The encoder 616 encodes the data and provides the encoded data to a modulator (MOD) 618. The data processing in the encoder 616 and the modulator 618 is carried out in accordance with reverse link generation as described in the text and figures above. The processed data is then provided to a transmitter within the front end 604. The transmitter modulates, filters, amplifies, and transmits the reverse link signal over the air, through antenna 602, on reverse link.

Figure 7:
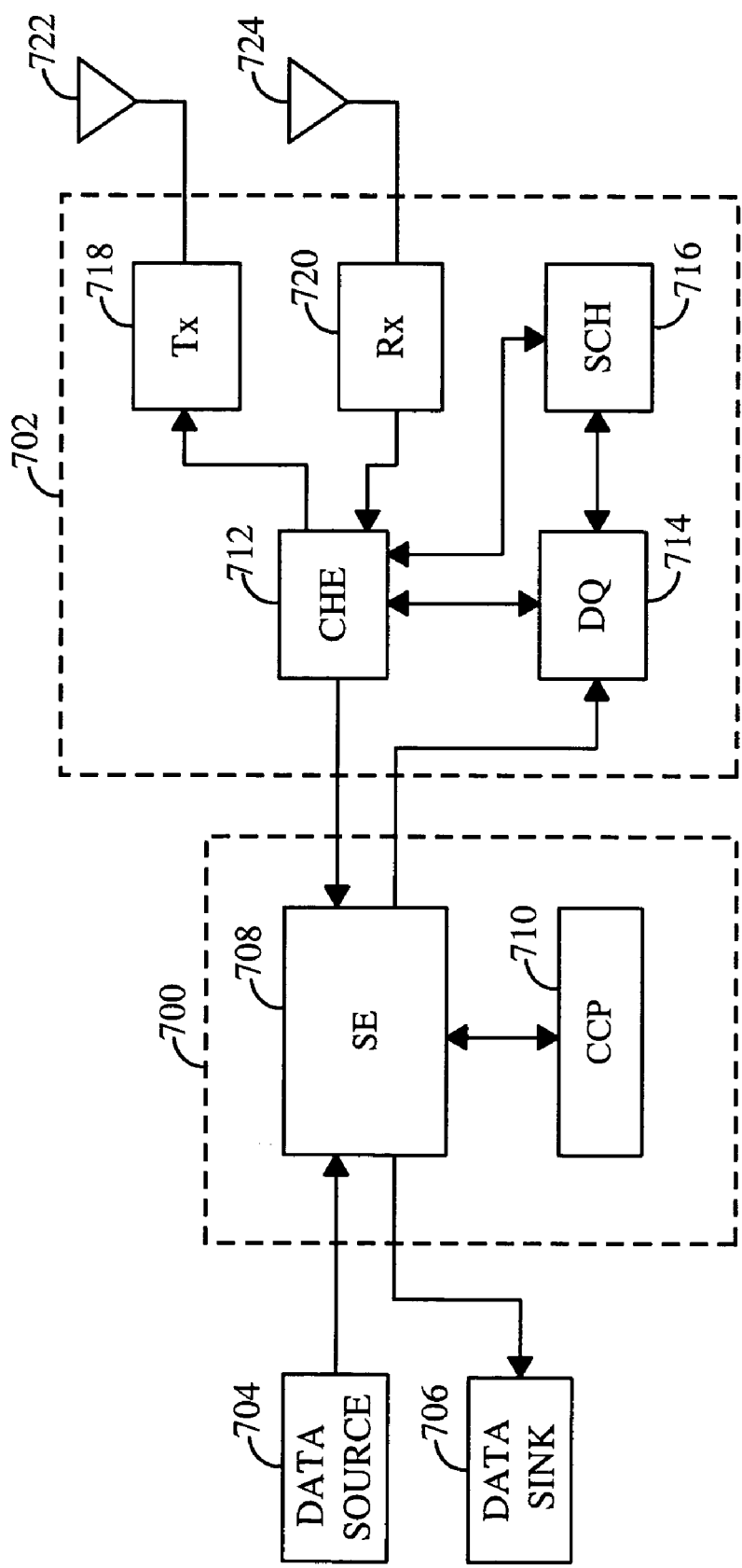
FIG. 7 illustrates an access point.

A controller 700 and an access terminal 702 are illustrated in FIG. 7. The user data generated by a data source 704, are provided via an interface unit, e.g., a packet network interface, PSTN, (not shown) to the controller 700. As discussed, the controller 700 interfaces with a plurality of access terminals, forming an access network. (Only one access terminal 702 is shown in FIG. 7 for simplicity). The user data are provided to a plurality of selector elements (only one selector element 702 is shown in FIG. 7 for simplicity). One selector element 708 is assigned to control the user data exchange between the data source 704 and data sink 706 and one or more base stations under the control of a call control processor 710. The call control processor 710 can comprise, e.g., a processor and a storage medium coupled with the processor and containing a set of instructions executable to the processor. As illustrated in FIG. 7, the selector element 702 provides the user data to a data queue 714, which contains the user data to be transmitted to access terminals (not shown) served by the access terminal 702. In accordance with the control of a scheduler 716, the user data is provided by the data queue 714 to a channel element 712. The channel element 712 processes the user data in accordance with the IS-856 standard, and provides the processed data to a transmitter 718. The data is transmitted over the forward link through antenna 722.

The reverse link signals from access terminals (not shown) are received at the antenna 724, and provided to a receiver 720. Receiver 720 filters, amplifies, demodulates, and digitizes the signal, and provides the digitized signal to the channel element 712. The channel element 712 performs the inverse of the signal processing functions done at an access point, and provides decoded data to selector element 708. Selector element 708 routes the user data to a data sink 706, and the overhead data to the call control processor 710.

One skilled in the art will appreciate that although the flowchart diagrams are drawn in sequential order for comprehension, certain steps can be carried out in parallel to an actual implementation.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the embodiments. Thus, the present invention is not intended to be limited to the embodiments shown herein but is to be accorded the widest scope consistent with the principles and novel features disclosed herein.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A method of allocating power to remote station specific control channels, the method comprising:
   A) sorting a plurality of access terminals in an order of increasing required medium access control (MAC) channel power into a plurality of bins;
   B) if two or more access terminals have equal required MAC channel power, sorting the access terminals with equal required MAC channel power in an order of decreasing forward link signal to interference and noise ratio (FL_SINR);
   C) determining total available ARQ power based upon total MAC channel power, total power allocated to reverse power control (RPC) channels, and total power allocated to reverse activity bit (RAB) channels;
   D) comparing the total available ARQ power to total required ARQ power of the access terminals; and
   E) if the total available ARQ power is less than the total required ARQ power of the access terminals in response to step D),
      a) reducing power allocation to users in one of the bins with highest required ARQ power in a predetermined increment until a predetermined maximum reduction is reached;
      b) reducing power allocation to users in each of remaining ones of the bins in a decreasing order of required ARQ power in the predetermined increment until a predetermined maximum reduction is achieved; and
      c) if the total available ARQ power is less than the total required ARQ power, repeating steps a) and b) until the total available ARQ power is greater than or equal to the total required ARQ power.

2. The method of claim 1, wherein the step of determining total available ARQ power comprises subtracting the total power allocated to the RPC channels and the total power allocated to the RAB channels from the total MAC channel power.

3. The method of claim 1, further comprising:
   F) if the total available ARQ power is greater than the total required ARQ power of the access terminals in response to step D),
      a) boosting power allocation to remaining access terminals in the order of decreasing FL_SINR; and
      b) boosting power allocation to ARQ channels of all active access terminals in predetermined increments until a predetermined maximum increase is reached.

4. The method of claim 1, wherein the step of determining total available ARQ power comprises:
   allocating a first predetermined fraction of the total MAC channel power to the RAB channels in a cell; and
   allocating not greater than a second predetermined fraction of the total MAC channel power to the RPC channels in the cell.

5. The method of claim 4, further comprising:
   computing the total required ARQ power for all of the access terminals in the cell;
   determining whether the access terminals include one or more non-handoff access terminals which failed to decode a packet after a last subpacket of the packet;
   if the access terminals include one or more non-handoff access terminals which failed to decode the packet after the last subpacket, determining whether a forward link signal to interference and noise ratio (FL_SINR) of each of the non-handoff access terminals which failed to decode the packet after the last subpacket is greater than a predetermined threshold;
   if the FL_SINR is greater than the predetermined threshold, allocating a first predetermined power level to an extended automatic repeat request (E-ARQ) channel of each of the non-handoff access terminals which failed to decode the packet after the last subpacket and which has FL_SINR greater than the predetermined threshold; and
   allocating a second predetermined power level to the E-ARQ channel otherwise.

6. The method of claim 1, further comprising assigning remaining MAC channel power to ARQ channels of all of the access terminals which regard the cell as a serving cell.

7. The method of claim 6, wherein the step of assigning the remaining MAC channel power to the ARQ channels of all of the access terminals which regard the cell as the serving cell comprises:
ranking all of the access terminals in an order according to the FL_SINR of each of the access terminals;
setting a number M initially to 0;
assigning ARQ channel power to a given one of the access terminals which regard the cell as the serving cell according to the steps of:
 a) if FL_SINR<−x−M, wherein x is a predetermined number, assigning a first predetermined ARQ channel power level to the given access terminal;
 b) if −x−M<FL_SINR<x−M, assigning a second predetermined ARQ channel power level to the given access terminal and
 c) if FL_SINR>x−M, assigning a third predetermined ARQ channel power level to the given access terminal; and
  if the remaining MAC channel power is depleted, incrementing M by 1; and
  repeating steps a)–c) until the remaining MAC channel power is assigned to the ARQ channels of all of the access terminals which regard the cell as the serving cell.

8. The method of claim 7, further comprising:
determining whether M is greater than 0 after all of the access terminals which regard the cell as the serving cell are assigned ARQ channel power;
if M is greater than 0,
setting an ARQMode flag; and
setting one or more new access terminals acquired by the cell in an on-off keying (OOK) mode.

9. The method of claim 8, further comprising:
determining whether M is equal to 0 for a predetermined number of consecutive slots;
if M is equal to 0 for a predetermined number of consecutive slots,
unsetting the ARQMode flag; and
setting one or more new access terminals acquired by the cell in a bipolar mode.

10. The method of claim 9, further comprising:
determining whether remaining MAC channel power is available after the ARQ channels of all of the access terminals which regard the cell as the serving cell are assigned MAC channel power and M is equals to 0; and
if the remaining MAC channel power is available after the ARQ channels of all of the access terminals which regard the cell as the serving cell are assigned MAC channel power and M is equals to 0,
assigning the remaining MAC channel power to ARQ channels of one or more soft-handoff access terminals which do not regard the cell as the serving cell and which have successfully decoded a packet before a last subpacket of the packet.

11. The method of claim 10, further comprising ranking the soft-handoff access terminals which do not regard the cell as the serving cell and which have successfully decoded the packet before the last subpacket in an order according to the FL_SINR of each of the soft-handoff access terminals which do not regard the cell as the serving cell and which have successfully decoded the packet before the last subpacket.

12. The method of claim 11, wherein a predetermined power level is assigned to the ARQ channels of the soft-handoff access terminals which do not regard the cell as the serving cell and which have successfully decoded the packet before the last subpacket according to the ranking until
either the ARQ channels of all of the soft-handoff access terminals which do not regard the cell as the serving cell and which have successfully decoded the packet before the last subpacket are assigned MAC channel power,
or the remaining MAC channel power is no longer available.

13. The method of claim 12, further comprising:
determining whether remaining MAC channel power is available after the ARQ channels of all of the soft-handoff access terminals which regard the cell as the serving cell and which have successfully decoded the packet before the last subpacket are assigned MAC channel power; and
if the remaining MAC channel power is available after the ARQ channels of all of the access terminals which regard the cell as the serving cell and which have successfully decoded the packet before the last subpacket are assigned MAC channel power, assigning the remaining MAC channel power to ARQ channels of one or more non-handoff access terminals.

14. A computer readable medium having computer-executable instructions stored thereon for allocating power to remote station specific control channels, comprising:
A) a first set of the instructions for sorting a plurality of access terminals in an order of increasing required medium access control (MAC) channel power into a plurality of bins;
B) if two or more access terminals have equal required MAC channel power, a second set of the instructions for sorting the access terminals with equal required MAC channel power in an order of decreasing forward link signal to interference and noise ratio (FL_SINR);
C) a third set of the instructions for determining total available ARQ power based upon total MAC channel power, total power allocated to reverse power control (RPC) channels, and total power allocated to reverse activity bit (RAB) channels;
D) a fourth set of the instructions for comparing the total available ARQ power to total required ARQ power of the access terminals; and
E) if the total available ARQ power is less than the total required ARQ power of the access terminals in response to step D),
 a) a fifth set of the instructions for reducing power allocation to users in one of the bins with highest required ARQ power in a predetermined increment until a predetermined maximum reduction is reached;
 b) a sixth set of the instructions for reducing power allocation to users in each of remaining ones of the bins in a decreasing order of required ARQ power in the predetermined increment until a predetermined maximum reduction is achieved; and
 c) if the total available ARQ power is less than the total required ARQ power, a seventh set of the instructions for repeating steps a) and b) until the total available ARQ power is greater than or equal to the total required ARQ power.

15. The computer readable medium of claim 14, wherein the third set of the instructions for determining total available ARQ power comprises an eight set of the instructions for subtracting the total power allocated to the RPC channels and the total power allocated to the RAB channels from the total MAC channel power.

16. The computer readable medium of claim 14, further comprising:
F) if the total available ARQ power is greater than the total required ARQ power of the access terminals in response to step D),
a) a ninth set of the instructions for boosting power allocation to remaining access terminals in the order of decreasing FL_SINR; and
b) a tenth set of the instructions for boosting power allocation to ARQ channels of all active access terminals in predetermined increments until a predetermined maximum increase is reached.

17. The computer readable medium of claim 14, wherein the third set of the instructions for determining total available ARQ power comprises:
an eleventh set of the instructions for allocating a first predetermined fraction of the total MAC channel power to the RAB channels in a cell; and
a twelfth set of the instructions for allocating not greater than a second predetermined fraction of the total MAC channel power to the RPC channels in the cell.

18. The computer readable medium of claim 17, further comprising:
a thirteenth set of the instructions for computing the total required ARQ power for all of the access terminals in the cell;
a fourteenth set of the instructions for determining whether the access terminals include one or more non-handoff access terminals which failed to decode a packet after a last subpacket of the packet;
if the access terminals include one or more non-handoff access terminals which failed to decode the packet after the last subpacket, a fifteenth set of the instructions for determining whether a forward link signal to interference and noise ratio (FL_SINR) of each of the non-handoff access terminals which failed to decode the packet after the last subpacket is greater than a predetermined threshold;
if the FL_SINR is greater than the predetermined threshold, a sixteenth set of the instructions for allocating a first predetermined power level to an extended automatic repeat request (E-ARQ) channel of each of the non-handoff access terminals which failed to decode the packet after the last subpacket and which has FL_SINR greater than the predetermined threshold; and
a seventeenth set of the instructions for allocating a second predetermined power level to the E-ARQ channel otherwise.

19. The computer readable medium of claim 14, further comprising an eighteenth set of the instructions for assigning remaining MAC channel power to ARQ channels of all of the access terminals which regard the cell as a serving cell.

20. The computer readable medium of claim 19, wherein the eighteenth set of the instructions for assigning the remaining MAC channel power to the ARQ channels of all of the access terminals which regard the cell as the serving cell comprises:
a nineteenth set of the instructions for ranking all of the access terminals in an order according to the FL_SINR of each of the access terminals;
a twentieth set of the instructions for setting a number M initially to 0;
a twenty-first set of the instructions for assigning ARQ channel power to a given one of the access terminals which regard the cell as the serving cell according to the steps of:
a) if FL_SINR<−x−M, wherein x is a predetermined number, a twenty-second set of the instructions for assigning a first predetermined ARQ channel power level to the given access terminal;
b) if −x−M<FL_SINR<x−M, a twenty-third set of the instructions for assigning a second predetermined ARQ channel power level to the given access terminal; and
c) if FL_SINR>x−M, a twenty-fourth set of the instructions for assigning a third predetermined ARQ channel power level to the given access terminal; and
if the remaining MAC channel power is depleted, a twenty-fifth set of the instructions for incrementing M by 1; and
a twenty-sixth set of the instructions for repeating steps a)–c) until the remaining MAC channel power is assigned to the ARQ channels of all of the access terminals which regard the cell as the serving cell.

21. The computer readable medium of claim 20, further comprising:
a twenty-seventh set of the instructions for determining whether M is greater than 0 after all of the access terminals which regard the cell as the serving cell are assigned ARQ channel power;
if M is greater than 0,
a twenty-eighth set of the instructions for setting an ARQMode flag; and
a twenty-ninth set of the instructions for setting one or more new access terminals acquired by the cell in an on-off keying (OOK) mode.

22. The computer readable medium of claim 21, further comprising:
a thirtieth set of the instructions for determining whether M is equal to 0 for a predetermined number of consecutive slots;
if M is equal to 0 for a predetermined number of consecutive slots,
a thirty-first set of the instructions for unsetting the ARQMode flag; and
a thirty-second set of the instructions for setting one or more new access terminals acquired by the cell in a bipolar mode.

23. The computer readable medium of claim 22, further comprising:
a thirty-third set of the instructions for determining whether remaining MAC channel power is available after the ARQ channels of all of the access terminals which regard the cell as the serving cell are assigned MAC channel power and M is equals to 0; and
if the remaining MAC channel power is available after the ARQ channels of all of the access terminals which regard the cell as the serving cell are assigned MAC channel power and M is equals to 0,
a thirty-fourth set of the instructions for assigning the remaining MAC channel power to ARQ channels of one or more soft-handoff access terminals which do not regard the cell as the serving cell and which have successfully decoded a packet before a last subpacket of the packet.

24. The computer readable medium of claim 23, further comprises a thirty-fifth set of the instructions for ranking the soft-handoff access terminals which do not regard the cell as the serving cell and which have successfully decoded the packet before the last subpacket in an order according to the FL_SINR of each of the soft-handoff access terminals which do not regard the cell as the serving cell and which have successfully decoded the packet before the last subpacket.

25. The computer readable medium of claim 24, wherein a predetermined power level is assigned to the ARQ channels of the soft-handoff access terminals which do not regard the cell as the serving cell and which have successfully decoded the packet before the last subpacket according to the ranking until
- either the ARQ channels of all of the soft-handoff access terminals which do not regard the cell as the serving cell and which have successfully decoded the packet before the last subpacket are assigned MAC channel power,
- or the remaining MAC channel power is no longer available.

26. The computer readable medium of claim 25, further comprising:
- a thirty-sixth set of the instructions for determining whether remaining MAC channel power is available after the ARQ channels of all of the soft-handoff access terminals which regard the cell as the serving cell and which have successfully decoded the packet before the last subpacket are assigned MAC channel power; and
- if the remaining MAC channel power is available after the ARQ channels of all of the access terminals which regard the cell as the serving cell and which have successfully decoded the packet before the last subpacket are assigned MAC channel power, a thirty-seventh set of the instructions for assigning the remaining MAC channel power to ARQ channels of one or more non-handoff access terminals.

* * * * *